United States Patent
Moor

[11] Patent Number: 5,632,450
[45] Date of Patent: May 27, 1997

[54] CHOPPER

[75] Inventor: Roland Moor, Lyss, Switzerland

[73] Assignee: Zyliss Haushaltwaren AG, Lyss, Switzerland

[21] Appl. No.: 446,464

[22] Filed: May 22, 1995

[30] Foreign Application Priority Data

Mar. 15, 1995 [CH] Switzerland ................ 737/95

[51] Int. Cl.⁶ ................................................ A47J 43/04
[52] U.S. Cl. .................... 241/100; 241/169; 241/270
[58] Field of Search ................................ 241/100, 169, 241/270

[56] References Cited

U.S. PATENT DOCUMENTS

| | | | |
|---|---|---|---|
| 1,686,280 | 10/1928 | Keller | 241/169 |
| 3,587,692 | 6/1971 | Nelson | 241/169 X |
| 3,933,315 | 1/1976 | Popeil | 241/166 |
| 4,967,970 | 11/1990 | Michel | 241/169 |

*Primary Examiner*—John M. Husar
*Attorney, Agent, or Firm*—Oblon, Spivak, McClelland, Maier & Neustadt, P.C.

[57] ABSTRACT

The chopper comprises an upper part, a cylindrical part axially displaceable therein with a head, a blade connected to the cylindrical part, a lower part which can be placed upon the upper part as well as a chopping cup which can be placed on the lower part. The lower part is provided with an outwardly protruding projection on its lower end. The chopping cup has a floor with a rim in its outer area which protrudes upwardly outside on the lower part. The rim is provided with nubs on the inside which together with the projection form a snap closure. During chopping, the chopped food remains in the chopping cup. After the chopping process has been completed, the chopping cup with the chopped food can be removed from the lower part.

23 Claims, 3 Drawing Sheets

CHOPPER

BACKGROUND OF THE INVENTION

1. Field of the Invention

The invention relates to a chopper with an upper part, a lower part detachably fastened to the upper part as well as an axially displaceable actuation part connected to at least one blade.

2. Dicussing of the Related Art

A prior art chopper of the aforementioned type has a drawback in that after the chopping process the chopped food lies on a supporting surface and, if not all the chopped food is used for cooking, must be put into a container. Moreover, when the lower part is lifted from the supporting surface, the chopped food removes itself from the lower part and must be put under the lower part again to continue chopping.

SUMMARY OF THE INVENTION

An object of the present invention is to improve the Prior art chopper in such a way that the mentioned drawbacks are avoided. This object is achieved according to the invention in that the lower part is provided with a removable chopping cup or with a floor. The invention also relates to a chopping cup for a chopper.

BRIEF DESCRIPTION OF THE DRAWINGS

Preferred embodiments and of the invention, as well as their application, will be described more closely in the following, with reference to the accompanying drawing in which.

DESCRIPTION OF THE PREFERRED EMBODIMENTS

Figure 1:
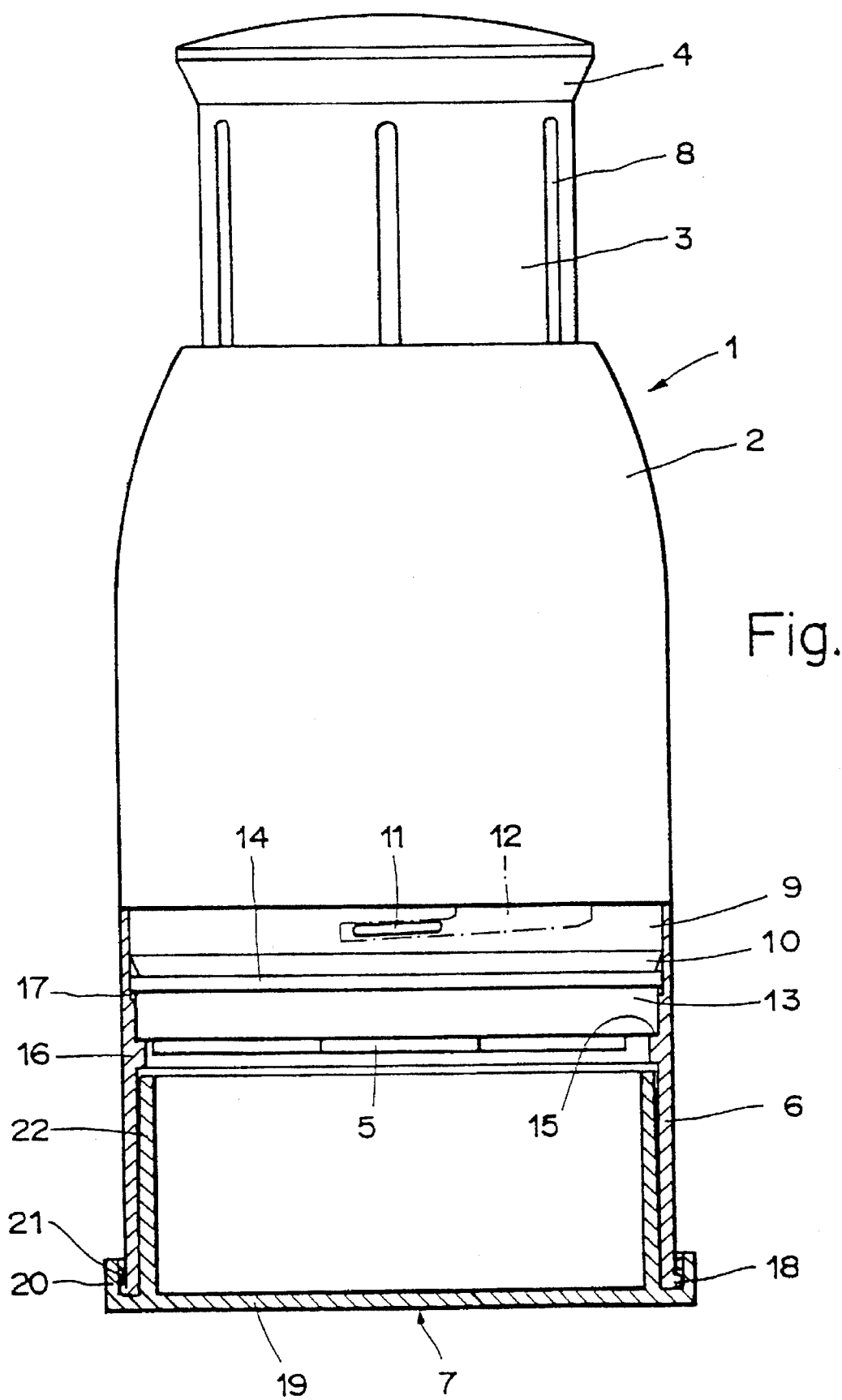
FIG. 1 is a view of a first embodiment of the chopper, partially in section.

The chopper 1, for example for chopping vegetables, according to the embodiment of the invention as shown in FIG. 1, comprises an upper part 2, a cylindrical actuation part 3 axially displaceable therein with a head 4, a blade 5 connected to the part 3, a lower part 6 which can be placed upon the upper part 2, and a chopping cup 7 which can be placed on the lower part 6. By means of grooves 8 in the cylindrical part 3, cylindrical part 3 is led into upper part 2 in such a way that, by pressing down firmly on the head, blade 5 executes an axial movement and a rotating movement. Upper part 2 is designed offset in its lower area 9 for placement of the lower part 6. The lower part 6 ends in a conical part 10 for easier placement of the lower part 6. The lower area 9 is provided with two tabs 11 opposite each other for the purpose of forming a bayonet catch. Lower part 6 is provided with corresponding grooves 12 in its upper area to form the bayonet catch between upper part 2 and lower part 6. Placed on blade 5 is a stripper 13 having an opening corresponding to the blade 15. The stripper 13 has an upper protruding rim 14. The lower edge 15 of the stripper 13 rests on an inwardly protruding projection 16 of lower part 6. The wall of lower part 6 has a step 17 somewhat below the upper rim 14 since stripper 13 and lower area 9 of upper part 2 do not have the same diameter. Lower part 6 is provided with an outwardly projecting fitting rim 18 on its lower end. Chopping cup 7 has a floor 19 having a rim 20 protruding upwardly in its outer area on the outside of lower part 6. Rim 20 is provided with nubs 21 on its inside, which together with the fitting rim 18 form a snap closure. On the inside of lower part 6, a cylindrical cup wall 22 extends upwardly from the floor 19. The cup wall 22 extends up to the area of projection 16.

During chopping, the chopped food remains in chopping cup 7. After the chopping process, chopping cup 7 with the chopped food can be removed from lower part 6 of the chopper. With a prior art chopper, when the lower part is lifted from the supporting surface, the chopped food removes itself from the lower part and must be put under the lower part again in order to continue chopping.

Figure 2:
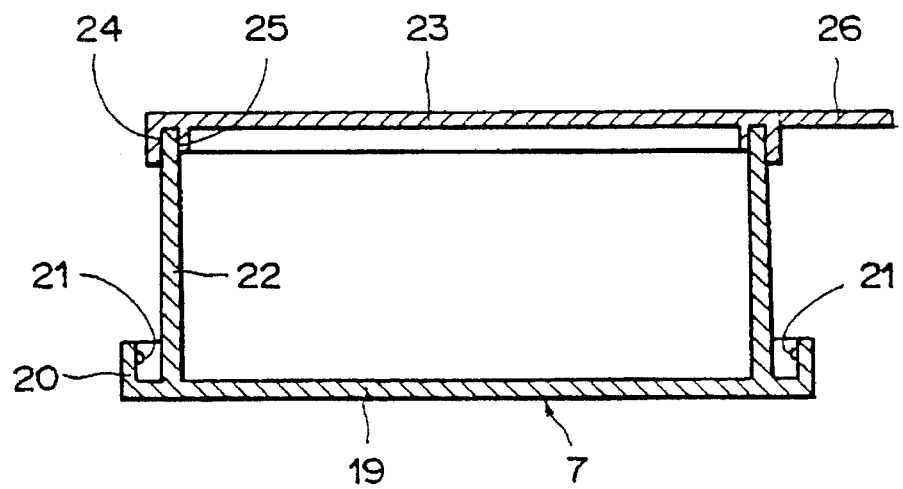
FIG. 2 is a sectional view of the chopping cup with a lid placed thereon.

Shown in FIG. 2 is chopping cup 7 with lid 23 placed on it. Lid 23 has a wider rim 24 on the outside and disposed, spaced apart therefrom, toward the inside, a narrower rim 25. With the two rims 24 and 25, lid 23 is placed on the cylindrical cup wall 22 of chopping cup 7. The lid has, in addition, a tab 26 to lift it up from the chopping cup. The chopped food which is left over can be kept in the refrigerator in chopping cup 7 with lid 23 placed on.

Figure 3:
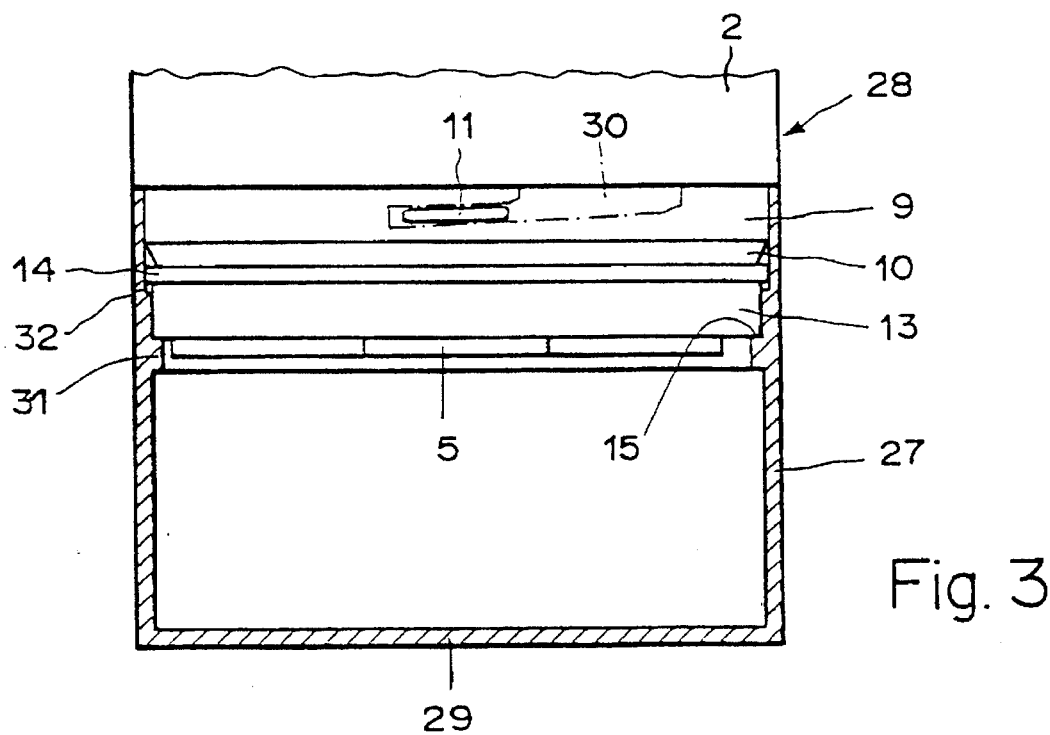
FIG. 3 shows the lower part and part of the upper part of the chopper according to a second embodiment.

Shown in FIG. 3 is the lower part 27 and part of the upper part 2 of a second embodiment 28 of the chopper. The upper part 2 is shown drawn broken off, and corresponds to the upper part in the first embodiment. The lower part 27 is shown in section. In the case of the lower part 27 according to this embodiment, the chopping cup is designed integrated with the lower part in that cylindrical lower part 27 is closed off with a floor 29. Lower part 27 likewise has two grooves 30 in the upper area which, together with the two tabs 11 on the upper part 2, form two bayonet closures. Lower part 27 likewise has a projection 31 on which the stripper 13 rests with its lower rim 15. Stripper 13 could be provided with a snap closure cooperating with the lower area of upper part 2 so that when removing lower part 27 the stripper 13 does not remain on the projection 31 itself. Moreover above projection 31 a step 32 is formed since the lower area 9 of the upper part 2 and the stripper 13 do not have the same diameter. With this embodiment too, the chopped food remains gathered together below in the lower part 27 designed as a chopping cup. Lower part 27, filled with the remaining chopped food, can be removed from the upper part, be provided with a lid, similar to that according to FIG. 2, and be preserved in the refrigerator.

In the case of a further embodiment, the lower part has in its lower area not a projection, but rather a thread for detachable fastening of the cup. The rim projecting upward outside on the lower part in the outer area of the floor of the cup does not have nubs, but is provided instead with a thread on the inside.

Figure 4:
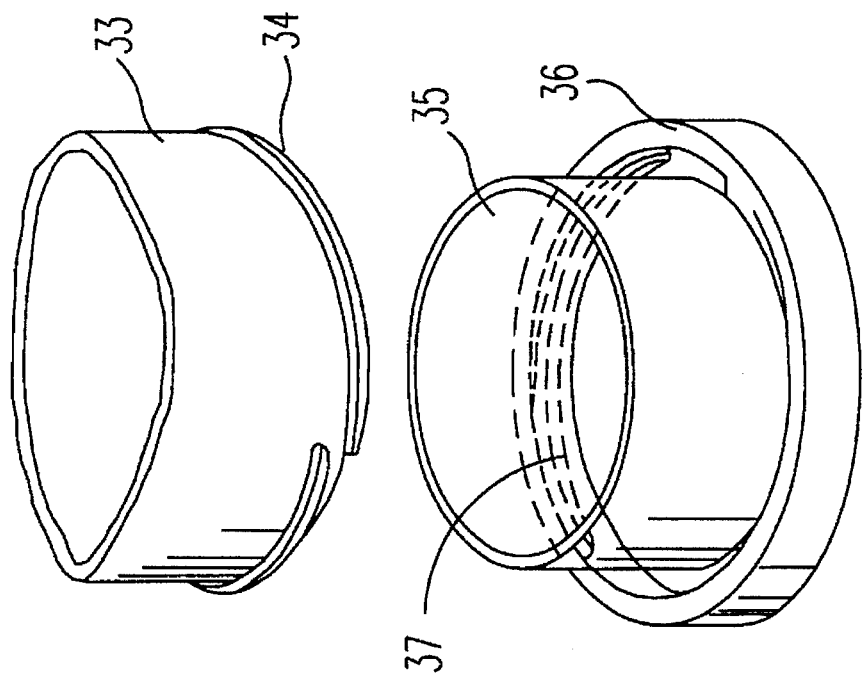
FIG. 4 is a perspective view of the lower part and of the chopping cup of a third embodiment.
Figure 5:
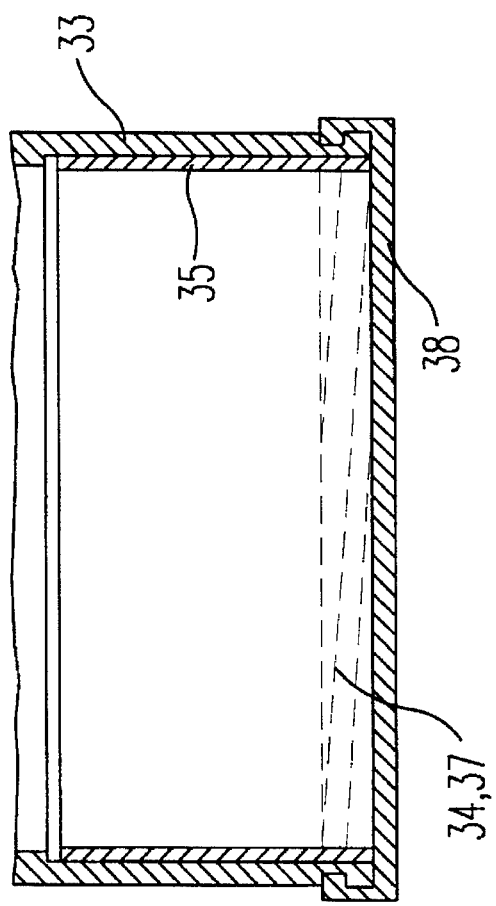
FIG. 5 is a section through the lower part and the chopping cup according to FIG. 4.

FIG. 4 shows a lower part 33 of the chopper with screw thread 34 and shows a chopping cup 35 with a rim 36 and screw thread 37. The screw thread 37 is screwed onto the screw thread 34. FIG. 5 is a section through the chopping cup 35 with rim 36, screw thread 37 and floor 38. The chopping cup is to be screwed on the lower part 33 of the chopper.

Obviously, numerous modifications and variations of the present invention are possible in light of the above teachings. It is therefore to be understood that within the scope of the appended claims, the invention may be practiced otherwise than as specifically described herein.

What is claimed is:

1. A chopper comprising an upper part, a lower part detachably fastened thereto, and an axially displaceable actuation part connected to at least one blade, wherein the lower part is provided with a one piece removable chopping cup, said chopping cup overlapping an interior of a large part of said lower part.

2. The chopper of claim 1, wherein the actuation part is axially displaceable and rotatable.

3. The chopper of claim 1, wherein the lower part is provided with fastening means in its lower area for detachably fastening the chopping cup.

4. The chopper of claim 3, wherein the fastening means are a first projection.

5. The chopper of claim 3, wherein the fastening means are a screw thread.

6. The chopper of claim 1, wherein the lower part is provided with a second projection for supporting a stripper.

7. The chopper of claim 6, wherein a stripper rests upon a lower area of the upper part and the second projection of the lower part.

8. An chopper of claim 7, wherein the upper rim of the stripper and the lower area of the upper part are provided with means to form a closure.

9. The chopper of claim 1, wherein the upper part is provided in its lower area with at least two tabs and the lower part is provided in its upper area with at least two grooves.

10. A chopper of claim 1, wherein the floor of the chopping cup is provided in its outer area with a rim running parallel to the cup wall.

11. The chopper of claim 10, wherein said rim is provided with means for detachably fastening the chopping cup.

12. The chopper of claim 11, wherein the means are nubs.

13. The chopper of claim 11, wherein the means are a screw thread.

14. Chopping cup for a chopper, comprising a floor and a cylindrical chopping cup wall connected thereto, the floor of the chopping cup being provided in its outer area with a rim running parallel to the wall of the chopping cup, said rim having fastening means for detachably fastening the chopping cup to a lower part of the chopper.

15. The chopping cup of claim 14, wherein the fastening means are nubs.

16. The chopping cup of claim 14, wherein the fastening means are a screw thread.

17. A chopper comprising an upper part, a lower part detachably fastened thereto, and an axially displaceable actuation part connected to at least one blade, wherein the lower part is provided with a floor, and the lower part is integral with the floor so as to define a chopping cup.

18. The chopper of claim 17, wherein the actuation part is axially displaceable and rotatable.

19. The chopper of claim 17, wherein the lower part is provided with a projection for supporting a stripper.

20. The chopper of claim 19, wherein the stripper rests upon a lower area of the upper part and the projection of the lower part.

21. The chopper of claim 20, wherein an upper rim of the stripper and the lower area of the upper part are provided with means to form a closure.

22. The chopper of claim 17, wherein the upper part is provided in its lower area with at least two tabs and the lower part is provided in its upper area with at least two grooves.

23. A chopper comprising:

an upper part, a lower part detachably fastened to the upper part, and an axially displaceable actuation part connected to at least one blade;

wherein the lower part is provided with a one piece removable chopping cup having a cylindrical wall, said cylindrical wall of said chopping cup extending into an inside of said lower part such that said lower part overlaps said cylindrical wall.

* * * * *